United States Patent
Tanihata

(10) Patent No.: US 6,826,919 B2
(45) Date of Patent: Dec. 7, 2004

(54) VAPOR-COMPRESSION REFRIGERANT CYCLE AND LOCK DETECTION DEVICE OF COMPRESSOR

(75) Inventor: Takuya Tanihata, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/660,000

(22) Filed: Sep. 11, 2003

(65) Prior Publication Data

US 2004/0050085 A1 Mar. 18, 2004

(30) Foreign Application Priority Data

Sep. 12, 2002 (JP) .................................. 2002-266948

(51) Int. Cl.$^7$ ........................... F25B 49/02; B60H 1/00
(52) U.S. Cl. ................................... 62/129; 62/126
(58) Field of Search ......................... 62/126, 129, 131, 62/127, 125, 130, 208, 209

(56) References Cited

U.S. PATENT DOCUMENTS

| | | | |
|---|---|---|---|
| 4,038,061 A | * 7/1977 | Anderson et al. ............. 62/126 |
| 5,197,298 A | 3/1993 | Kobayashi et al. | |
| 5,275,009 A | * 1/1994 | Kobayashi et al. ........... 62/129 |
| 5,623,834 A | * 4/1997 | Bahel et al. ................... 62/131 |
| 5,934,087 A | * 8/1999 | Watanabe et al. ............. 62/126 |
| 5,970,733 A | * 10/1999 | Hamaoka et al. .......... 62/228.4 |

* cited by examiner

Primary Examiner—Harry B. Tanner
(74) Attorney, Agent, or Firm—Harness, Dickey & Pierce, PLC

(57) ABSTRACT

A vapor-compression refrigerant cycle includes a variable displacement compressor for compressing refrigerant, a control unit for controlling the displacement of the compressor. The control unit includes a lock determining means for determining a lock of a sliding portion of the compressor, and the lock determining means determines that the sliding portion of the compressor is locked, when a control signal where the displacement of the compressor is equal to or larger than a predetermined value is output from the control unit, and when an absolute value of a temperature difference between an air temperature before being heat-exchanged in a low-pressure heat exchanger of the vapor-compression refrigerant cycle and the air temperature after being heat-exchanged in the low-pressure heat exchanger is equal to or smaller than a predetermined temperature. Therefore, the lock of the compressor can be accurately detected.

9 Claims, 2 Drawing Sheets

VAPOR-COMPRESSION REFRIGERANT CYCLE AND LOCK DETECTION DEVICE OF COMPRESSOR

CROSS REFERENCE TO RELATED APPLICATION

This application is based on Japanese Patent Application No. 2002-266948 filed on Sep. 12, 2002, the disclosure of which is incorporated herein by reference.

BACKGROUND OF THE INVENTION

1. Field of the Invention

The present invention relates to a vapor-compression refrigerant cycle with a control unit for determining a lock of a compressor. The vapor-compression refrigerant cycle is suitably used for a vehicle air conditioner.

2. Related Art

In a control unit of a vapor-compression refrigerant cycle described in U.S. Pat. No. 5,197,298 (corresponding to JP-B2-820151), a lock (fixing) of a sliding portion of a compressor is determined based on a pressure of high-pressure refrigerant. However, the pressure of the high-pressure refrigerant in the refrigerant cycle changes in accordance with a change of a thermal load (i.e., air-conditioning load) of the refrigerant cycle. Therefore, it is difficult to accurately determine whether or not the compressor is locked up, and lock phenomenon (fixing phenomenon) may be incorrectly detected.

SUMMARY OF THE INVENTION

In view of the above-described problems, it is an object of the present invention to provide a vapor-compression refrigerant cycle with a control unit for accurately determining a lock of a compressor.

It is another object of the present invention to provide a lock detection device of the compressor, which prevents a lock from being incorrectly detected.

According to the present invention, a vapor-compression refrigerant cycle includes a compressor for compressing refrigerant, a high-pressure heat exchanger for cooling high-pressure refrigerant discharged from the compressor, a decompression unit for decompressing refrigerant from the high-pressure heat exchanger, a low-pressure heat exchanger for evaporating low-pressure refrigerant after being decompressed in the decompression unit by performing heat exchange between the low-pressure refrigerant and air passing through the low-pressure heat exchanger, a first air temperature detector for detecting an air temperature before being heat-exchanged in the low-pressure heat exchanger, and a second air temperature detector for detecting an air temperature after being heat-exchanged in the low-pressure heat exchanger, and a control unit for controlling a displacement of the compressor. Further, the control unit has a lock determining means for determining a lock of a sliding portion of the compressor. In the control unit of the vapor-compression refrigerant cycle, the lock determining means determines that the sliding portion of the compressor is locked, at least when a control signal where the displacement of the compressor is equal to or larger than a predetermined value is output from the control unit, and when an absolute value of a temperature difference between the air temperature before being heat-exchanged in the low-pressure heat exchanger and the air temperature after being heat-exchanged in the low-pressure heat exchanged is equal to or smaller than a predetermined temperature. Therefore, the lock of the sliding portion of the compressor can be accurately detected.

Preferably, the lock determining means determines that the sliding portion of the compressor is locked, when the control signal where the displacement of the compressor is equal to or larger than the predetermined value is output from the control unit, and when the absolute value of the temperature difference is equal to or smaller than the predetermined temperature, and further when a pressure of the high-pressure refrigerant detected by a refrigerant pressure detector tends to be reduced. In this case, the lock of the compressor can be more accurately detected.

More preferably, the lock determining means determines that the sliding portion of the compressor is locked, when the control signal where the displacement of the compressor is equal to or larger than the predetermined value is output from the control unit, when the absolute value of the temperature difference is equal to or smaller than the predetermined temperature, and when the pressure of the high-pressure refrigerant detected by the refrigerant pressure detector tends to be reduced, and further when the air temperature detected by the second air temperature detector tends to be increased. Further, the lock determining means determines that the sliding portion of the compressor is locked, when the control signal where the displacement of the compressor is equal to or larger than the predetermined value is output from the control unit, when the absolute value of the temperature difference is equal to or smaller than the predetermined temperature, when the pressure of the high-pressure refrigerant detected by the refrigerant pressure detector tends to be reduced, and when the air temperature detected by the second air temperature detector tends to be increased, and further when an absolute value of a temperature difference between a target temperature of air after being heat-exchanged in the low-pressure heat exchanger and the air temperature detected by the second air temperature detector is larger than a set value. In this case, it can prevent the lock of the compressor from being incorrectly detected.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENT

A preferred embodiment of the present invention will be now described with reference to FIGS. 1 and 2. In this embodiment, a vapor-compression refrigerant cycle of the present invention is typically used for a vehicle air conditioner.

Figure 1:
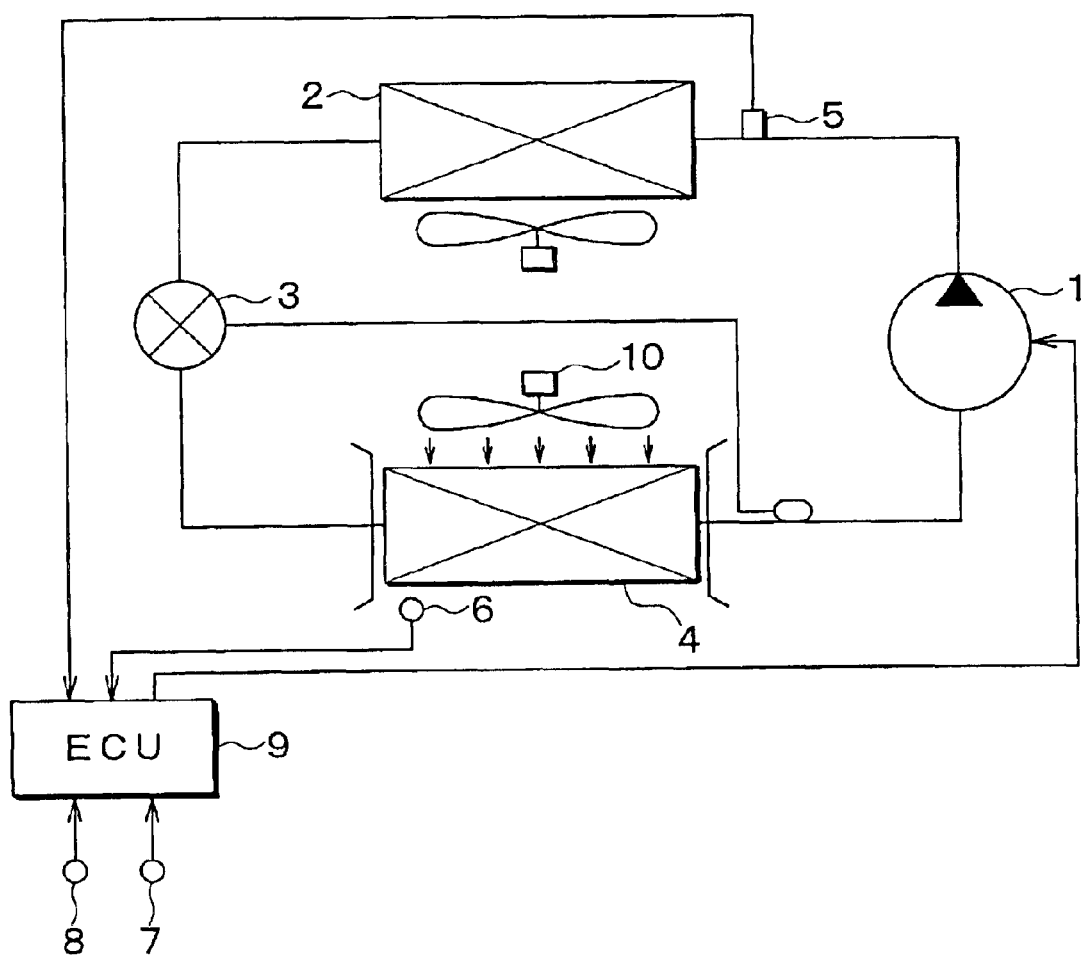
FIG. 1 is a schematic diagram showing a vapor-compression refrigerant cycle according to a preferred embodiment of the present invention.
Figure 2:
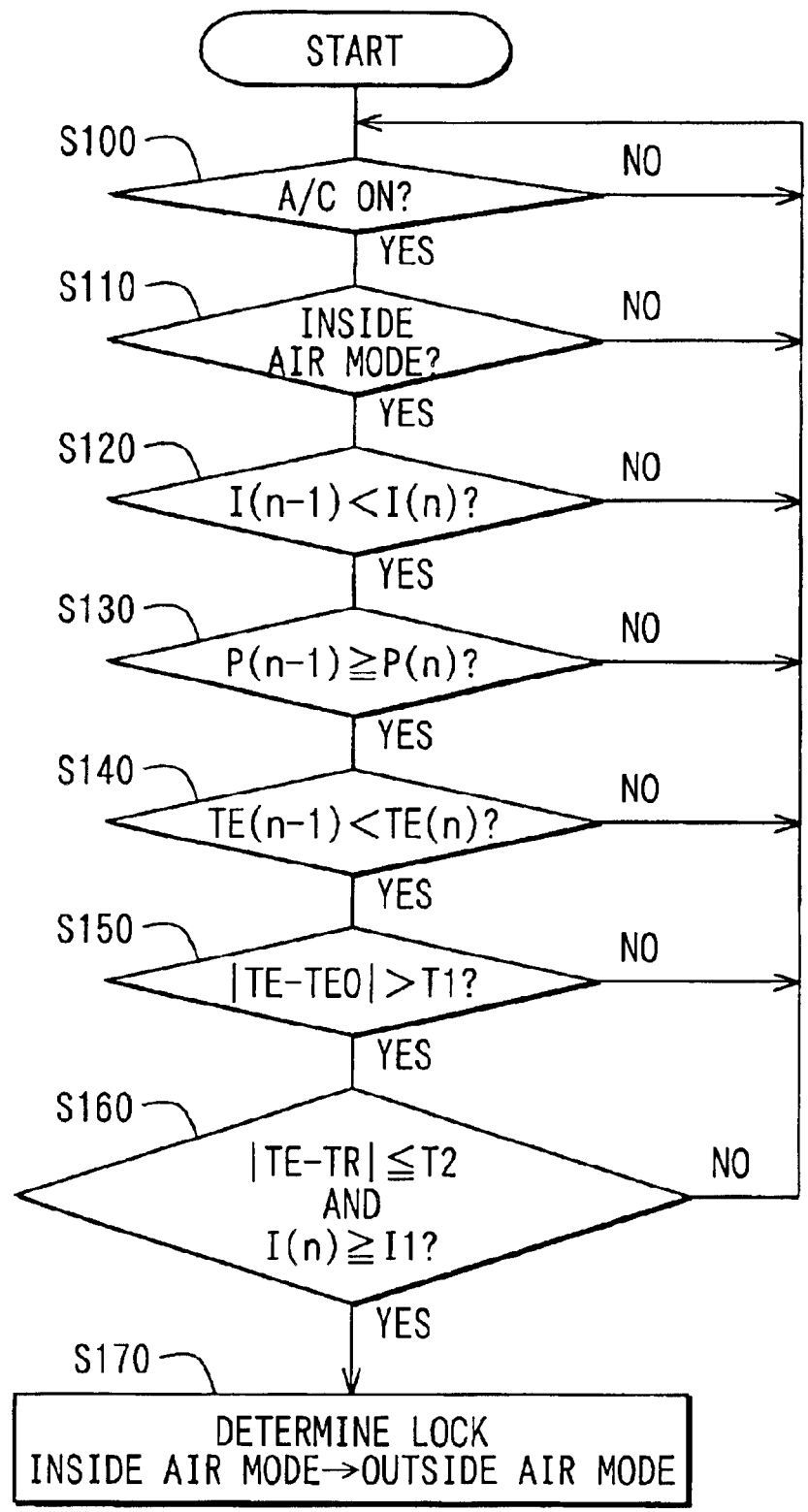
FIG. 2 is a flow diagram for determining lock phenomenon of a compressor according to the preferred embodiment.

As shown in FIG. 1, the vapor-compression refrigerant cycle includes a compressor 1. The compressor 1 is a variable displacement compressor for sucking and compressing refrigerant, and is driven by a vehicle engine (not shown). Power from the vehicle engine is transmitted to the compressor 1 through a V-belt. The operation of the compressor 1 is mechanically linked with the operation of the vehicle engine. That is, the compressor 1 is started or stopped in accordance with start or stop operation of the vehicle engine. Generally, a pulley with the V-belt has therein a torque limiter mechanism that shuts a torque transmission when a transmitted torque is larger than a predetermined value.

The variable displacement compressor can change a refrigerant flow amount discharged from the compressor 1 per rotation of the compressor 1. In this embodiment, the compressor 1 is a swash-plate type, and controls pressure in a swash plate chamber so that a slanting angle of a swash plate is changed, for example. Thus, one stroke of a piston is changed, and the displacement of the compressor 1 is changed. Specifically, when a control current value or an electrical duty ratio applied to a control valve of the compressor 1 is made larger, the displacement (discharge capacity) of the compressor 1 is increased. On the other hand, when control current value or electrical duty ratio applied to the control valve of the compressor 1 is made smaller, the displacement (discharge capacity) of the compressor 1 is decreased.

The radiator 2 is a high-pressure heat exchanger for cooling high-pressure refrigerant discharged from the compressor 1. Refrigerant discharged from the radiator 2 is decompressed in a decompression valve 3, and the decompressed refrigerant from the decompression valve 3 is evaporated in an evaporator 4 by absorbing heat from air passing through the evaporator 4. The evaporator 4 is a low-pressure heat exchanger in which the low-pressure refrigerant from the decompression valve 3 and air to be blown into a passenger compartment are heat exchanged.

A refrigerant pressure sensor 5 is disposed to detect a pressure of a high-pressure refrigerant discharged from the compressor 1, before being decompressed in the decompression valve 3. A post-evaporator air temperature sensor 6 is disposed to detect an air temperature immediately after performing heat exchange with the refrigerant in the evaporator 4. An inside air temperature sensor 7 is disposed for detecting an air temperature TR in the passenger compartment, and an outside air temperature sensor 8 is disposed for detecting an air temperature TAM outside the passenger compartment.

An electronic control unit (ECU) 9 controls the displacement of the compressor 1, an air blowing amount of a blower 10, an inside/outside air switching device (not shown) and the like. The inside/outside air switching device is generally arranged to set at least an inside air introduction mode where inside air (i.e., air inside the passenger compartment) is introduced to the blower 10, and an outside air introduction mode where outside air (i.e., air outside the passenger compartment) is introduced to the blower 10. Air blown by the blower 10 is cooled in the evaporator 4 while passing through the evaporator 4, and is blown toward the passenger compartment.

Next, control operation of the electronic control unit 9 for detecting a lock phenomenon (fixing phenomenon) of the compressor 1 will be now described with reference to FIG. 2. First, at step S100, it is determined whether or not the vapor-compression refrigerant cycle is in an operating operation (i.e., A/C ON state). In this embodiment, when the control current value applied to the compressor 1 is larger than a minimum value, the compressor 1, that is, the vapor-compression refrigerant cycle is in operating. When the vapor-compression refrigerant cycle is stopped, the control program returns.

Then, at step S110, it is determined whether or not the air introduction mode is the inside air introduction mode. When the inside air introduction mode is set, the previous control current valve I(n−1) (i.e., the last control current value) applied to the compressor 1 and the present control current value I(n) applied to the compressor 1 are compared, at step S120. Specifically, at step S120, it is determined whether the present control current value I(n) is larger than the last control current value I(n−1) before the present time. When the inside air introduction mode is not set at step S110, that is, when the outside air introduction mode is set at step S110, or the present control current value I(n) is not larger than the last control current value I(n−1) at step S120, the control program returns to step S100.

The control current value I is controlled so that a target post-evaporator air temperature TEO becomes a predetermined temperature. Generally, the target post-evaporator air temperature TEO is set about in a temperature range of 3–4° C. However, the target post-evaporator air temperature TEO can be changed to become lower as the outside air temperature becomes lower.

When the present control current value I(n) is larger than the last electric current valve I(n−1), it is estimated there is fears of a lock of the compressor 1 and a reduce of the cooling capacity in the evaporator 4. In this case, at step S130, the pressure P(n) of the high-pressure refrigerant detected by the refrigerant pressure sensor 5 at the present time and the pressure P(n−1) of the high-pressure refrigerant detected by the refrigerant pressure sensor 5 at the last time before the present time are compared. When the pressure P(n) of the high-pressure refrigerant detected by the refrigerant pressure sensor 5 at the present time is equal to or lower than the pressure P(n−1) of the high-pressure refrigerant detected by the refrigerant pressure sensor 5 at the last time before the present time, it is estimated there is fears of the lock of the compressor 1 and the reduce of the cooling capacity in the evaporator 4. In this case, at step S140, the post-evaporator air temperature TE(n) detected at the present time is compared with the post-evaporator air temperature TE(n−1) detected at the last time before the present time. When the post-evaporator air temperature TE(n) detected at the present time is higher than the post-evaporator air temperature TE(n−1) detected at the last time before the present time at step S140, the control program moves to step S150.

On the other hand, when the present control current value I(n) is equal to or smaller than the last control current value I(n−1) at step S120, or when the pressure P(n) of the high-pressure refrigerant detected at the present time is higher than the pressure P(n−1) of the high-pressure refrigerant detected at the last time before the present time at step S130, or when the post-evaporator air temperature TE(n) detected at the present time is equal to or lower than the post-evaporator air temperature TE(n−1) detected at the last time before the present time at step S140, the control program returns to step S100.

When the post-evaporator air temperature TE(n) detected at the present time is higher than the post-evaporator air temperature TE(n−1) detected at the last time before the present time at step S140, it is estimated there is fears of the lock of the compressor 1 and the reduce of the cooling capacity in the evaporator 4. In this case, at step S150, it is determined whether or not the absolute value of a temperature difference between the post-evaporator air temperature TE(n) detected at the present time and the target temperature TEO of air immediately after performing heat exchange in the evaporator 4 is larger than a predetermined temperature difference Ti. When the absolute value of the temperature difference |TE−TEO| between the post-evaporator air temperature TE(n) and the target temperature TEO is larger than the predetermined temperature difference T1, it is estimated there is fears of the lock of the compressor 1 and the reduce of the cooling capacity in the evaporator 4. In this case, at step S160, it is determined whether or not the absolute value of a temperature difference between the post-evaporator air temperature detected at the present time and the inside air temperature TR to be introduced into the evaporator 4 is equal to or smaller than a predetermined value T2 (|TE−TR|≦T2) and the present control current value I(n) is equal to or larger than a predetermined current valve I1. When the determination at step S160 is YES, it is determined that the sliding portion of the compressor 1 is locked up at step S170. In this case, at step S170, the inside/outside air switching device switches the air introduction mode from the inside air introduction mode to the outside air introduction mode, so it can restrict a windshield of the vehicle from being fogged. In FIG. 2, because the inside air introduction mode is set, the air temperature before being heat-exchanged in the evaporator 4 is the same as the inside air temperature TR. That is, at step S160, it is determined whether or not the absolute of a temperature difference between the air temperature before being heat-exchanged in the evaporator 4 and the air temperature after being heat-exchanged in the evaporator 4.

On the other hand, when |TE−TEO|≦T1 at step S150, or when |TE−TR|>T2 or I(n)<I1 at step S160, the control program returns to step S100.

According to the present invention, the lock phenomenon of the compressor is determined at least based on the present control current value I(n) applied to the compressor 1 and the temperature difference between the inside air temperature TR (i.e., the air temperature introducing to the evaporator 4) of the passenger compartment and the detected post-evaporator air temperature TE. Therefore, it is compared with a case where the lock phenomenon of the compressor 1 is determined only based on the pressure of the high-pressure refrigerant, the lock of the compressor can be accurately detected.

Further, in the present invention, the lock phenomenon of the compressor 1 is determined based on a decrease tendency of the high-pressure refrigerant pressure, an increase tendency of the post-evaporator air temperature TE, and the temperature difference between the post-evaporator air temperature TE and the target temperature TEO, in addition to the control current value I(n) and the temperature difference |TE−TR| between the inside air temperature TR and the post-evaporator air temperature TE. Accordingly, a lock of the compressor 1 can be more accurately determined.

Although the present invention has been fully described in connection with the preferred embodiment thereof with reference to the accompanying drawings, it is to be noted that various changes and modifications will become apparent to those skilled in the art.

For example, in the above-described embodiment, the lock phenomenon of the compressor 1 is determined based on the decrease tendency of the high-pressure refrigerant pressure at step S130, the increase tendency of the post-evaporator air temperature TE at step S140, the temperature difference between the post-evaporator air temperature TE and the target temperature TEO at step S150, in addition to the control current value I(n) and the temperature difference between the inside air temperature TR and the post-evaporator air temperature TE at step S160. However, the lock determination of the compressor 1 can be performed only by the determination at step S160 in FIG. 2. Alternatively, the lock determination of the compressor 1 can be performed only by the determinations at steps S130 and S160 in FIG. 2. Further, the lock determination of the compressor 1 can be performed only by the determinations at steps S130, S140 and S160 in FIG. 2. That is, the lock determination of the compressor 1 can be performed by combination between the determination at step S160 and at least one of the determinations at steps S130–S150.

In the above-described embodiment, the present invention is applied to the vapor-compression refrigerant cycle where the operation of the compressor 1 is mechanically linked with the operation of the vehicle engine. However, the present invention can be applied to a case where a power transmitting device such as an electromagnet clutch for transmitting and stopping the power is provided between the vehicle engine and the compressor 1. Further, only when the lock phenomenon of the compressor 1 is determined, the power transmission from the vehicle engine to the compressor 1 is stopped regardless of the air introduction mode.

In the above-described embodiment of the present invention, the lock of the compressor 1 is determined by using the inside air temperature TR at step S160 in the inside air introduction mode. However, the lock of the compressor 1 can be determined by using the outside air temperature TAM instead of the inside air temperature TR at step S160, in the outside air introduction mode. That is, at step S160 in FIG. 2, the lock of the compressor 1 can be determined based on the present control current value I(n) and the absolute value of a temperature difference between the outside air temperature TAM and the present post-evaporator air temperature TE(n).

Further, the lock determination of the compressor 1 can be performed based on the present control current value I(n) and the absolute of a temperature difference between the post-evaporator air temperature TE and an air temperature introducing into the evaporator 4, regardless of the inside air introduction mode and the outside air introduction mode. Even in this case, the air temperature before being heat exchanged in the evaporator 4 can be detected or calculated.

Further, in the above-described embodiment, the vapor-compression refrigerant cycle with the load detection system of the compressor can be used for an apparatus other than the vehicle air conditioner.

Such changes and modifications are to be understood as being within the scope of the present invention as defined by the appended claims.

What is claimed is:

1. A vapor-compression refrigerant cycle comprising:
    a compressor for compressing refrigerant, the compressor having a variable displacement;
    a high-pressure heat exchanger for cooling high-pressure refrigerant discharged from the compressor;
    a decompression unit for decompressing refrigerant from the high-pressure heat exchanger;
    a low-pressure heat exchanger for evaporating low-pressure refrigerant after being decompressed in the decompression unit, by performing heat exchange between the low-pressure refrigerant and air passing through the low-pressure heat exchanger;
    a first air temperature detector for detecting an air temperature before being heat-exchanged in the low-pressure heat exchanger; and
    a second air temperature detector for detecting an air temperature after being heat-exchanged in the low-pressure heat exchanger; and a control unit for controlling a displacement of the compressor, wherein:

the control unit has a lock determining means for determining a lock of a sliding portion of the compressor; and the lock determining means determines that the sliding portion of the compressor is locked, when a control signal where the displacement of the compressor is equal to or larger than a predetermined value is output from the control unit, and when an absolute value of a temperature difference between the air temperature before being heat-exchanged in the low-pressure heat exchanger and the air temperature after being heat-exchanged in the low-pressure heat exchanged is equal to or smaller than a predetermined temperature.

2. The vapor-compression refrigerant cycle according to claim 1, further comprising a refrigerant pressure detector for detecting a pressure of the high-pressure refrigerant before being decompressed in the decompression unit, wherein the lock determining means determines that the sliding portion of the compressor is locked, when the control signal where the displacement of the compressor is equal to or larger than the predetermined value is output from the control unit, and when the absolute value of the temperature difference is equal to or smaller than the predetermined temperature, and further when the pressure of the high-pressure refrigerant detected by the refrigerant pressure detector tends to be reduced.

3. The vapor-compression refrigerant cycle according to claim 2, wherein the lock determining means determines that the sliding portion of the compressor is locked, when the control signal where the displacement of the compressor is equal to or larger than the predetermined value is output from the control unit, when the absolute value of the temperature difference is equal to or smaller than the predetermined temperature, and when the pressure of the high-pressure refrigerant detected by the refrigerant pressure detector tends to be reduced, and further when the air temperature detected by the second air temperature detector tends to be increased.

4. The vapor-compression refrigerant cycle according to claim 3, wherein the lock determining means determines that the sliding portion of the compressor is locked, when the control signal where the displacement of the compressor is equal to or larger than the predetermined value is output from the control unit, when the absolute value of the temperature difference is equal to or smaller than the predetermined temperature, when the pressure of the high-pressure refrigerant detected by the refrigerant pressure detector tends to be reduced, and when the air temperature detected by the second air temperature detector tends to be increased, and further when an absolute value of a temperature difference between a target temperature of air after being heat-exchanged in the low-pressure heat exchanger and the air temperature detected by the second air temperature detector is larger than a set value.

5. The vapor-compression refrigerant cycle according to claim 1, wherein the control unit controls an electrical control value applied to the compressor so as to control the displacement of the compressor.

6. A lock detection device for detecting a lock of a sliding portion of a variable displacement compressor for a refrigerant cycle having a high-pressure heat exchanger for cooling high-pressure refrigerant discharged from the compressor and a low-pressure heat exchanger for evaporating low-pressure refrigerant after being decompressed by performing heat exchange between the low-pressure refrigerant and air passing through the low-pressure heat exchanger, the lock detection device comprising:

a first air temperature detector for detecting an air temperature before being heat-exchanged in the low-pressure heat exchanger; and a second air temperature detector for detecting an air temperature after being heat exchanged in the low-pressure heat exchanger; and lock determining means for determining a lock of the sliding portion of the compressor, wherein the lock determining means determines that the sliding portion of the compressor is locked, when a control signal where the displacement of the compressor is equal to or larger than a predetermined value is output from a control unit for controlling a displacement of the compressor, and when an absolute value of a temperature difference between the air temperature before being heat-exchanged in the low-pressure heat exchanger and the air temperature after being heat-exchanged in the low-pressure heat exchanged is equal to or smaller than a predetermined temperature.

7. The lock detection device according to claim 6, further comprising a refrigerant pressure detector for detecting a pressure of the high-pressure refrigerant before being decompressed in the decompression unit, wherein the lock determining means determines that the sliding portion of the compressor is locked, when the control signal where the displacement of the compressor is equal to or larger than the predetermined value is output from the control unit, and when the absolute value of the temperature difference is equal to or smaller than the predetermined temperature, and further when the pressure of the high-pressure refrigerant detected by the refrigerant pressure detector tends to be reduced.

8. The lock detection device according to claim 7, wherein the lock determining means determines that the sliding portion of the compressor is locked, when the control signal where the displacement of the compressor is equal to or larger than the predetermined value is output from the control unit, when the absolute value of the temperature difference is equal to or smaller than the predetermined temperature, and when the pressure of the high-pressure refrigerant detected by the refrigerant pressure detector tends to be reduced, and further when the air temperature detected by the second air temperature detector tends to be increased.

9. The lock detection device according to claim 8, wherein the lock determining means determines that the sliding portion of the compressor is locked, when the control signal where the displacement of the compressor is equal to or larger than the predetermined value is output from the control unit, when the absolute value of the temperature difference is equal to or smaller than the predetermined temperature, when the pressure of the high-pressure refrigerant detected by the refrigerant pressure detector tends to be reduced, and when the air temperature detected by the second air temperature detector tends to be increased, and further when an absolute value of a temperature difference between a target temperature of air after being heat-exchanged in the low-pressure heat exchanger and the air temperature detected by the second air temperature detector is larger than a set value.

* * * * *